United States Patent

Higuchi et al.

[11] Patent Number: 4,877,665
[45] Date of Patent: Oct. 31, 1989

[54] LINING MATERIAL FOR PIPE LINES

[75] Inventors: Kumao Higuchi, Chiba; Akio Morinaga, Fujisawa; Masahiro Seshimo, Nishinomiya; Hitoshi Saito, Moriguchi, all of Japan

[73] Assignees: Tokyo Gas Kabushiki Kaisha, Tokyo; Ashimori Tokyo Kabushiki Kaisha, Osaka, both of Japan

[21] Appl. No.: 233,658

[22] PCT Filed: Oct. 30, 1987

[86] PCT No.: PCT/JP87/00839
§ 371 Date: Jul. 1, 1988
§ 102(e) Date: Jul. 1, 1988

[87] PCT Pub. No.: WO88/03476
PCT Pub. Date: May 19, 1988

[30] Foreign Application Priority Data
Nov. 4, 1986 [JP] Japan .................. 61-262496

[51] Int. Cl.[4] .............. F16L 55/16; F16L 55/18
[52] U.S. Cl. ................ 428/36.1; 428/229; 428/245; 428/257; 428/258; 428/259; 138/124; 138/125; 138/97; 138/98
[58] Field of Search ........... 428/36.1, 229, 245, 428/257, 258, 259, 215; 138/124, 125, 97, 98

[56] References Cited

U.S. PATENT DOCUMENTS

| | | | |
|---|---|---|---|
| 3,817,288 | 6/1974 | Ball | 138/125 |
| 3,866,631 | 2/1975 | Chudgar | 138/125 |
| 4,276,908 | 7/1981 | Horne | 428/36.1 |
| 4,388,365 | 6/1983 | Hasegawa | 428/258 |
| 4,407,885 | 10/1983 | Murphy et al. | 428/246 |
| 4,553,568 | 11/1985 | Piccoli et al. | 138/125 |
| 4,576,205 | 3/1986 | Morinaga et al. | 438/124 |
| 4,600,615 | 7/1986 | Hyodo et al. | 428/36.1 |
| 4,681,783 | 7/1987 | Hyodo et al. | 428/36.1 |
| 4,684,556 | 8/1987 | Ohtsuga et al. | 428/36.1 |
| 4,686,126 | 8/1987 | Hyodo et al. | 428/36.1 |
| 4,723,579 | 2/1988 | Hyodo et al. | 428/36.1 |
| 4,724,178 | 2/1988 | Hyodo et al. | 428/36.1 |

FOREIGN PATENT DOCUMENTS 59-225921 12/1984 Japan .
60-75476 5/1985 Japan .

*Primary Examiner*—Ellis P. Robinson
*Assistant Examiner*—Archene A. Turner
*Attorney, Agent, or Firm*—Birch, Stewart, Kolasch & Birch

[57] ABSTRACT

A lining material for pipelines such as gas conduits, city water pipelines, sewage pipelines, and petroleum pipelines which having a structure wherein a layer of bulky yarns is fastened to either one of the inner and outer surfaces of a tubular textile jacket and an air-impervious layer made of a rubber or a synthetic resin is bonded to the other surface of the jacket, and exhibits excellent shape-maintaining property against external pressure and earthquake-resistance after being applied to the pipelines.

12 Claims, 2 Drawing Sheets

LINING MATERIAL FOR PIPE LINES

TECHNICAL FIELD

The present invention relates to a lining material for pipe lines, chiefly those buried in the ground, such as gas conduits, city water pipelines, sewage pipes, construction pipelines housing power transmission wires or telecommunication cables, oil pipelines, etc. More particularly, the present invention relates to a lining material which is suitable for use in a pipe-lining method wherein a tubular lining material provided on the inner surface thereof with a binder is inserted into a pipeline while being evaginated under fluid pressure and bonded onto the inner surface of the pipeline with the aid of the binder. The liner is both earthquake-resistant and in maintain its shape against external pressure.

BACKGROUND ART

In recent years, the following lining materials have been used for pipelines similar to that described in the preceding Technical Field:

(1) A lining material having a tubular textile jacket provided on the outer surface thereof, in which the surface facing the inner surface of a pipeline is bonded to its inner surface while being turned inside out, and also with a film of a rubber or a synthetic resin (Japanese Laid-open Patent Appln. No. Sho. 56-8229 or Japanese Laid-open Utility Model Appln. No. Sho. 56-3619). (2) A lining material having the above-mentioned structure but having two layers of the tubular textile jacket (Japanese Laid-open Patent Appln. No. Sho. 59-225921). (3) A lining material having the above-mentioned structure wherein its tubular textile jacket is composed of a combination of a tubular textile jacket and a tubular woven or unwoven fabric (Japanese Laid-open Patent Appln. No. Sho. 59-225920).

The lining materials used previously are air-impervious that allows the lining material to be evaginated by fluid pressure. The lining material is strong enough to withstand the fluid pressure during evagination. Once evaginated a binder is applied in an amount sufficient to bond the lining material onto the inner surface of the pipe line. However, such lining materials cannot be said to fully satisfy the performance conditions required in this art.

One of the purposes of providing pipelines with a lining material is to make the pipelines earthquake-resistant. Namely, even if a pipe line is destroyed by earthquake, the lining material should not be destroyed and maintain by itself the a passageway for transporting the internal fluid such as gas or water while preventing any leakage of the fluid. Necessary for this purpose is that the lining material should have a high tenacity and strength and should be impregnated with a large amount of the binder so that the binder may be solidified with the lining material to form a pipeline within the pipe line which is not collapsed by external pressure but maintains its shape against external pressure. Accordingly, the lining material should desirably have a fibrous layer that can be impregnated with a large amount of a binder and an air-impervious layer of a rubber or a synthetic resin for bonding to the fibrous layer.

Conventional lining materials, as disclosed in Japanese Laid-open Utility Model Appln. Nos. Sho. 56-8229 and 56-3619 wherein the fibrous layer is only comprised of the tubular textile jacket, cannot be impregnated with a sufficient amount of the binder in the lining treatment. Thus, it is impossible to obtain a sufficiently thick layer of the solidified binder to form a pipe capable of withstanding external pressure. The lining material as disclosed in Japanese Laid-open Patent Appln. No. Sho. 59-225921, wherein two layers of the tubular textile jacket are impregnated with a larger amount of the binder, is incapable of maintaining its shape in the against external pressure.

The lining material as disclosed in Japanese Laid-open Patent Appln. No. Sho. 59-225920, wherein the tubular textile jacket is provided on the inner surface thereof with a thick layer of an unwoven fabric, can be impregnated with a large amount of the binder and forms a thick cured binder layer when bonded to the pipeline. On the other hand, however, the manufacture of this lining material is very difficult requiring a long unwoven fabric made in a tubular form by sewing should be inserted into a long textile jacket woven in a tubular form. In addition, the manufacture of a long tubular unwoven fabric is troublesome and needs a plurality of difficult steps since a tubular unwoven fabric cannot be manufactured directly, but can be manufactured only by sewing both edges of the unwoven fabric in the form of a sheet. In the case of a fabric combined with an unwoven fabric, the fabric is overlaid with the unwoven fabric and needle-punching is applied towards the surface of the unwoven fabric. Where a tubular textile jacket is provided on the inner surface thereof with a tubular unwoven fabric, it is impossible to apply needle-punching outwardly from the interior space of the tubular unwoven fabric. If needle-punching is applied inwardly from the outer surface of the tubular textile jacket, the tubular unwoven fabric will not bind to the tubular textile jacket and will slip during the process of manufacture or evagination of the lining material making it difficult to obtain a satisfactory quality of the lining material.

SUMMARY OF THE INVENTION

It is a primary object of the present invention to provide a lining material which is free of such defects as seen in the conventional products, easy the manufacture and install and can be impregnated with a large amount of a binder, thus making it earthquake resistant and resistant against external pressure after being installed.

In accordance with the present invention, there is provided a tubular lining material for pipelines utilizable in a pipe-lining method wherein the tubular lining material is bonded onto the inner surface of a pipeline, which material includes:

(a) a tubular textile jacket;

(b) a layer of bulky yarns fastened to either one of the inner and outer surfaces of the tubular textile jacket; and (c) an air-impervious layer made of a rubber or a synthetic resin bonded to the other surface of the tubular textile jacket wherein the bulky yarns are sufficiently thicker than the yarns constituting the tubular textile jacket 4.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The lining material of the present invention for pipelines will now be explained with reference to the drawings.

DETAILED DESCRIPTION OF THE DRAWINGS

Figure 1:
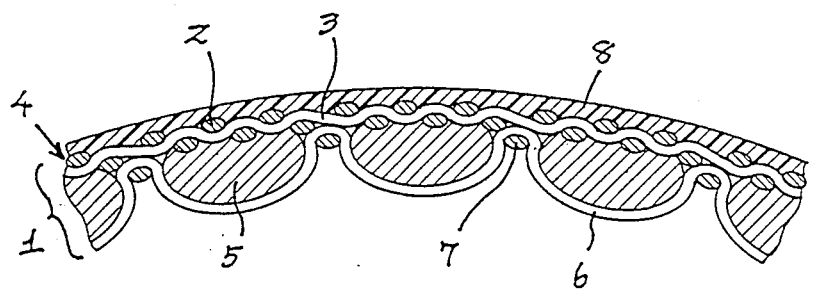
FIG. 1 is a cross-sectional view of the lining material of a preferred embodiment of the invention.
Figure 4:
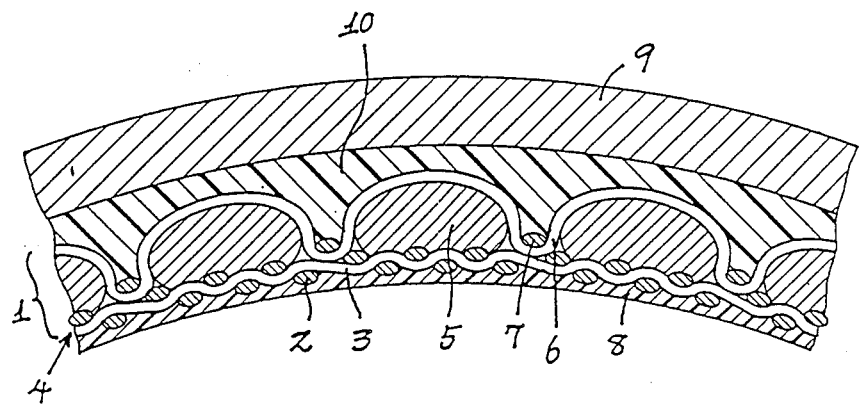
FIG. 4 is a cross-sectional view of the lining material a preferred embodiment where the inner surface is bonded to a pipe line.

The present invention will become more fully understood from the detailed description given hereinbelow and the accompanying drawings which are given by way of illustration only, and thus are not limitative of the present invention, and wherein:

In FIG. 1, 1 is a fibrous layer having such structure that a tubular textile jacket 4 manufactured by weaving warps 2 and a weft 3 made of synthetic fibers is overlaid on the inner surface thereof, (this surface is to be bonded to the inside of a pipeline in a pipe lining method wherein the lining material is evaginated by fluid pressure) a plurality of bulky yarns 5, which are much thicker than the warps 2 and the weft 3, are arranged parallel to the warps 2 and periodically fastened, roughly but integrally, to the tubular textile jacket 4 by the aid of fastening wefts 6 and fastening warps 7. On the outer surface of the fibrous layer 1, an air-impervious layer 8 made of a rubber or a synthetic resinous material is formed by bonding.

The yarns constituting the warps 2, the weft 3, the fastening yarns 6 and 7 can be made of ordinary polyester yarns or nylon yarns. If the lining material is to be earthquake resistant, after having been applied to a pipeline, it is preferable to use polyester yarns of high tenacity for the warps 2 and the weft 3. In order to improve adhesivity to the air-impervious layer 8, it is preferable to use a polyester spun yarn or a twisted polyester long filament yarn or a mixture of these yarns for at least one of the warps 2 and the weft 3.

The thickness of these yarns varies according to the diameter of a pipeline to be lined or of particular intended use, but a yarn having a thickness of 500–5000 denier can properly be used for the warps 2 and the weft 3, the wrap 2 and weft 3 are woven densely to form the tubular textile jacket 4. It is also desirable to use a yarn having a similar thickness for the fastening weft 6 and the fastening warp 7.

In contrast, a yarn much thicker than the warps 2 and the weft 3 is used for the bulky yarn 5. This bulky yarn 5 is manufactured by subjecting synthetic fibers to a bulking processing treatment whereby the apparent diameter of the processed yarn becomes larger, i.e. several times larger than the diameter of the warps 2 and the weft 3. The height of the bulky yarn 5 projecting from the inner surface of the tubular textile jacket 4 depends on the diameter of a pipeline and the need for earthquake-resistance and shape-maintaining property against external pressure, but is preferably within the range of 2–10 mm on the condition that the bulky yarn 5 is fastened to the tubular textile jacket 4.

A number of the bulky yarns 5 are arranged on the contact surface of the tubular textile jacket 4. The bulky yarns 5 are used preferably in such number that the contact surface of the tubular textile jacket 4 may substantially be covered with the bulky yarns 5. At least 50% of the contact surface of the tubular textile jacket 4 is preferably covered with the bulky yarns 5 at least in unloaded conditions. If the covering rate of the bulky yarns 5 is low, the tubular textile jacket 4 will not be impregnated in uncovered portions with a sufficient amount of the binder so that the content of the binder in the whole lining material will be decreased to cause deterioration in shape-maintaining property against external pressure after pipe-lining.

Figure 2:
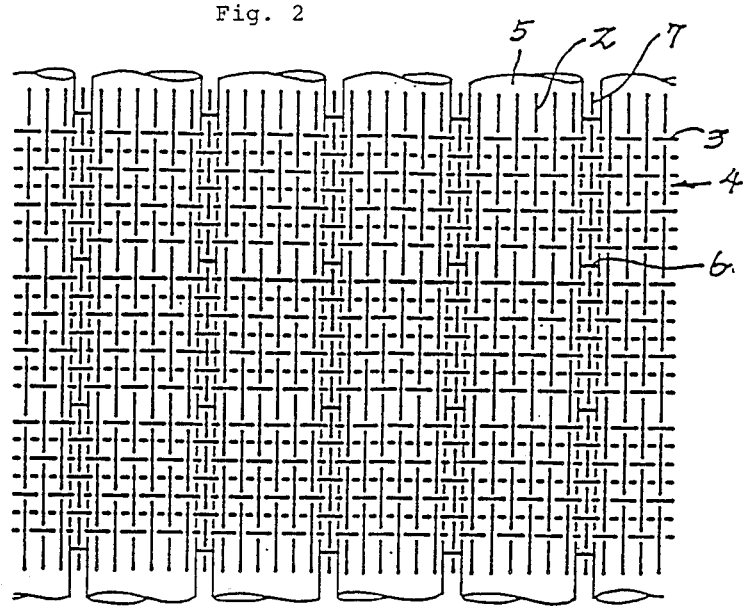
FIG. 2 is a plan view of the lining material of this invention schematically showing an example of the woven structure of the fibrous layer.

Any of the woven structure can be used for the fibrous layer 1. In FIG. 2 schematically showing an example of the woven structure of the fibrous layer, the warps 2 and the weft 3 constituting the tubular textile jacket 4 may have any type of woven structure, such as a plain fabric or twill. The tubular textile jacket is overlaid on the inner surface thereof with the bulky yarns 5 arranged parallel to the warps 2. The inner side of the bulky yarns 5 is provided with the fastening weft 6 arranged at an interval in circumferential direction and the fastening wefts 6 are fastened to the tubular textile jacket 4 by the fastening warps 7.

Figure 3:
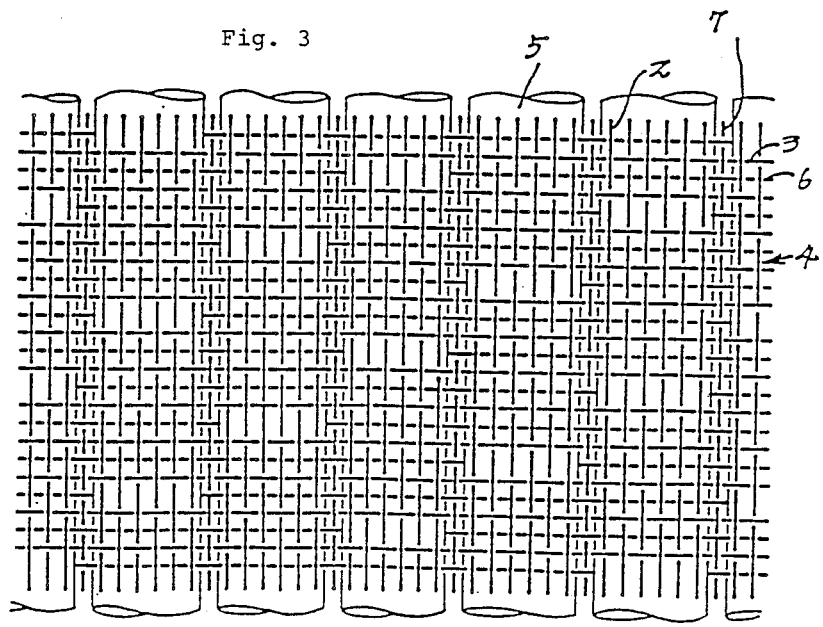
FIG. 3 is a plan view schematically showing another embodiment of the woven structure of the fibrous layer

FIG. 3 shows schematically another example of the woven structure of the fibrous layer 1. In this woven structure, the tubular textile jacket 4 is woven as a plain fabric with the warp 2 and the tubular textile jacket 3 and has such a woven structure that the bulky yarns 5 and the fastening wefts 6 are woven in a very coarse stin structure and the fastening wefts 6 are fastened to the tubular textile jacket 4 by the fastening warps 7.

The woven structure of the fibrous layer 1 is not limited to those as shown in these examples. Any type of woven structure can be used so far as the tubular textile jacket 4 itself has a strongly woven structure and the fastening of the bulky yarns 5 thereto, which are provided on the inner surface of the jacket, is ensured. In the foregoing explanation, the bulky yarns 5 are arranged on the inner surface of the tubular textile jacket 4 longitudinally of the lining material. The bulky yarns may be arranged a circumferential direction of the lining material.

Where the lining material is used in a pipe-lining method for insertion into a pipeline by evagination, the bulky yarns 5 are arranged on the inner side of the tubular textile jacket 4 and the air-impervious layer 8 is formed on the outer side. Where the lining material is used in a pipe-lining method wherein the lining material is inserted into a pipeline, the lining material has a structure reverse to the above-mentioned one, wherein the bulky yarns 5 are arranged on the outer surface of the tubular textile jacket 4 and the air-impervious layer 8 is formed on the inner surface thereof.

The air-impervious layer 8 is composed of a rubbery or synthetic resinous material which is flexible, such as a soft plastic material, and is bonded firmly onto the inner or outer surface of the tubular lining material 4. Materials for the air-impervious layer 8 are preferably adhesive to the fibers constituting the tubular textile jacket 4. Where polyester yarns are used as the warps 2 and the weft 3, the air-impervious layer 8 is preferably made of a thermoplastic elastic resinous material of polyester series.

The lining material of this invention for pipelines has the several advantages over conventional liners. In the lining material of this invention, bulky yarns, thicker than yarns constituting the tubular textile jacket, are fastened onto the surface to be bonded onto a pipe line so that a layer of the bulky yarns can be impregnated with a large amount of a binder to form a thick rigid binder layer on the inner surface of the pipe line. This yield excellent shape-maintaining quality against external pressure to the pipeline. The layer of the bulky yarns are not integrally bonded to the tubular textile jacket but are fastened thereto by the fastening warps and wefts so that evagination of the lining material is smooth.

In a preferred embodiment of the present invention, the construction of the lining material to be applied to a pipeline having a nominal diameter of 100 mm is illustrated. A tubular textile jacket 4 was woven as a plain fabric 360, yarns each, made by twisting two 1000 denier polyester filament yarns to form the warps 2 and by twisting 20 count number polyester spun yarn to form the weft 3 and picked up at 40 pick count/10 cm. On the inner surface of the tubular textile jacket 4 are arranged parallel to the warps 2, 60 bulky yarns 5 each of which made by twisting 8 yarns which had been obtained by subjecting 1700 denier nylon yarns to a bulking processing. A fastening warp 6 made by twisting two 1000 denier polyester filament yarns was picked up at 10 pick count/10 cm to fasten the bulky yarns 5 to the tubular textile jacket 4 by a fastening warp 7 disposed between the bulky yarns 5 whereby a fibrous layer 1 as shown in FIG. 2 was formed. The fibrous layer 1 thus obtained was provided on the outer surface thereof with a thermoplastic polyester elastic resin to form an air-impervious layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tubular lining material for pipelines utilizable in a pipe-lining method wherein the tubular lining material is bonded onto the inner surface of a pipeline, which material comprises:

(a) a tubular textile jacket having an inner and outer surface, said tubular textile jacket comprising a plurality of interwoven yarns;
    (b) a plurality of bulky yarns interwoven with said plurality of yarns along either one of the inner or outer surface of the tubular textile jacket, said plurality of bulky yarns being proportionably larger in size than said plurality of yarns, and
    (c) an air-impervious layer bonded to the other surface of the tubular textile jacket than said plurality of bulky yarns.

2. A lining material as recited in claim 1 wherein said plurality of bulky yarns is disposed along the inner surface of said tubular textile jacket; and said air-impervious layer is disposed along the outer surface of said tubular textile jacket.

3. A lining material according to claim 1, wherein the height of said plurality of bulky yarns is within the range of 2-10 mm in diameter.

4. A lining material according to claim 1, wherein at least 50% of the surface area of the tubular textile jacket is covered by said plurality of bulky yarns.

5. A lining material as recited in claim 1 wherein said plurality of interwoven yarns further comprises:
    warps which are disposed perpendicular to the longitudinal length of the tubular lining; and wefts which are disposed parallel to the longitudinal length of the tubular lining and interworn with said warps to form said textile jacket.

6. A lining material as recited in claim 5 wherein said wefts further comprises fastening wefts for securing said plurality of bulky yarns.

7. A lining material as recited in claim 6 wherein said warps further comprises fastening warps disposed between said bulky yarns and overlapping said fastening wefts for securing said plurality of bulky yarns.

8. A lining material as recited in claim 1 wherein said airimpervious layer is rubber.

9. A lining material as recited in claim 1 wherein said air-impervious layer is synthetic resin.

10. A lining material as recited in claim 1 wherein said plurality of interwoven yarns is a plain fabric weave.

11. A lining material as recited in claim 1 wherein said plurality of interwoven yarns is a twill.

12. A lining material as recited in claim 1 wherein said plurality of bulky yarns is disposed along the outer surface of said textile jacket; and said air-impervious layer is disposed along the inner surface of said textile jacket.

* * * * *

UNITED STATES PATENT AND TRADEMARK OFFICE
CERTIFICATE OF CORRECTION

PATENT NO. : 4,877,665

DATED : October 31, 1989

INVENTOR(S) : Kumao Higuchi, Akio Morinaga, Masahiro Seshimo and Hitoshi Saito.

It is certified that error appears in the above-identified patent and that said Letters Patent is hereby corrected as shown below:

Title page:

Second Assignee change "Ashimori Tokyo Kabushiki Kaisha" to --Ashimori Kogyo Kabushiki Kaisha--

Signed and Sealed this

Twenty-sixth Day of June, 1990

Attest:

HARRY F. MANBECK, JR.

Attesting Officer

Commissioner of Patents and Trademarks